US009870539B2

(12) United States Patent
Raghunath et al.

(10) Patent No.: US 9,870,539 B2
(45) Date of Patent: Jan. 16, 2018

(54) ESTABLISHING COMMUNICATION IN A RICH MEDIA NOTICE BOARD

(75) Inventors: Mandayam Thondanur Raghunath, Karnataka (IN); Deepak Achuthan Menon, Tamil Nadu (IN); Rahul Suresh Kulkarni, Maharashtra Karnataka (IN); Balaji Gopalan, Tamil Nadu (IN); Anshu Surana, Karnataka (IN); Suhas Abhimanyu Phand, Karnataka (IN)

(73) Assignee: Google LLC, Mountain View, CA (US)

( * ) Notice: Subject to any disclaimer, the term of this patent is extended or adjusted under 35 U.S.C. 154(b) by 1224 days.

(21) Appl. No.: 12/960,207

(22) Filed: Dec. 3, 2010

(65) Prior Publication Data
US 2011/0167354 A1    Jul. 7, 2011

Related U.S. Application Data

(63) Continuation of application No. PCT/US2009/046577, filed on Jun. 8, 2009.

(30) Foreign Application Priority Data

Jun. 6, 2008 (IN) .......................... 1386/CHE/2008

(51) Int. Cl.
*G06F 3/00* (2006.01)
*G06Q 10/00* (2012.01)
(Continued)

(52) U.S. Cl.
CPC ........... *G06Q 10/00* (2013.01); *G06F 3/0481* (2013.01); *G06F 3/0482* (2013.01); *G06F 3/16* (2013.01); *G06F 17/30873* (2013.01)

(58) Field of Classification Search
CPC .............................. G06F 3/16; H04M 2201/40
(Continued)

(56) References Cited

U.S. PATENT DOCUMENTS 6,493,703 B1    12/2002  Knight et al.
7,426,467 B2 *   9/2008  Nashida et al. .............. 704/275
(Continued)

OTHER PUBLICATIONS

Shirali-Shahreza, M. Hassan et al., Localized CAPTCHA for Illiterate People, International Conference on Intelligent and Advanced Systems, 2007, pp. 1-5.*

(Continued)

*Primary Examiner* — Joy M Weber
(74) *Attorney, Agent, or Firm* — McDermott Will & Emery LLP

(57) ABSTRACT

A rich media notice board enables users to communicate with others in their own and related communities who use the rich media notice board or other rich media notice boards, such as those in related communities, as well as with others who use conventional interfaces via the Internet. The users of the rich media notice board can post notices including text, images, audio, and video to the rich media notice board. The notices may also include usage metaphors that may allow users to relate to the notices. A user interface of the rich media notice board may employ the usage metaphors to provide an interface that may be used by users who may not read or write with sufficient proficiency to otherwise use a computer. The users may access the rich media notice boards from computers, mobile phones, and kiosk systems.

32 Claims, 5 Drawing Sheets

(51) Int. Cl.
   *G06F 3/16*      (2006.01)
   *G06F 3/0481*    (2013.01)
   *G06F 17/30*     (2006.01)
   *G06F 3/0482*    (2013.01)

(58) Field of Classification Search
   USPC .................................... 715/738, 865, 707
   See application file for complete search history.

(56) References Cited

U.S. PATENT DOCUMENTS

| | | | | |
|---|---|---|---|---|
| 2003/0078784 | A1* | 4/2003 | Jordan | G10L 15/22 704/275 |
| 2006/0294476 | A1* | 12/2006 | Buckley | G06F 17/30716 715/781 |
| 2008/0040693 | A1 | 2/2008 | Toyama et al. | |
| 2008/0163379 | A1* | 7/2008 | Robinson et al. | 726/27 |
| 2008/0221901 | A1* | 9/2008 | Cerra | G10L 15/065 704/270.1 |
| 2009/0172546 | A1* | 7/2009 | Chang | G06F 3/038 715/728 |
| 2009/0204885 | A1* | 8/2009 | Ellsworth et al. | 715/234 |

OTHER PUBLICATIONS

International Search Report dated Jul. 29, 2009, issued in the corresponding International Patent Application No. PCT/US2009/046577.

Written Opinion dated Jul. 29, 2009, issued in the corresponding International Patent Application No. PCT/US2009/046577.

* cited by examiner

ESTABLISHING COMMUNICATION IN A RICH MEDIA NOTICE BOARD

STATEMENT OF RELATED PATENT APPLICATIONS

This patent application is a continuation of International Application No, PCT/US2009/046577, titles "Rich Media Notice Board," filed Jun. 8, 2009, which claims priority to India Provisional Patent Application No. 1386/CHE/2008, titled "Rich Media Notice Board," filed Jun. 6, 2008. The complete disclosure of each of the above-identified applications is hereby fully incorporated herein by reference.

TECHNICAL FIELD

The invention relates in general to the field of Internet communications with groups having particularized communications needs and, in particular, to groups reachable at respective physical locations.

BACKGROUND

A large class of users may not read or write with sufficient proficiency to use computers, which may thus prevent such users from benefiting from the Internet revolution. This barrier may also cause technology to intimidate some of these users, which in turn may prevent such users from even attempting to reap the advantages of computers and the Internet. In addition, users that confront these challenges to Internet communication may often reside in rural villages or other communities that have little or no connectivity to networks that in past years have penetrated the literate world.

SUMMARY OF THE INVENTION

A rich media notice board may comprise a publicly accessible repository of notices. Notices to the rich media notice board may comprise text, images, audio and/or video. The rich media notice board may be associated with a target community at a particular geographic location, such as, for example, a village or rural community. These are referred to below as "geographical communities", tied to a single specific site for the electronic notice board. They may also include other communities, such as urban neighborhoods or scholastic communities. The term "geographic community" does not encompass networks of individuals who happen to associate themselves with a city or other location but who view content in connection with such network from wherever they happen to be rather than a single central site physically tied to the geographic community Members of the geographic community may post a notice on the rich media notice board, and the members may access notices posted there. Users of the kiosk systems and/or electronic notice boards according to aspects of the present invention need not have their own accounts.

Accessing notices on the rich media notice board may comprise "playing" said notices on a computer or other processor. The term "playing" encompasses not only the playing of an audio file, but also display of text, images and other rich media. The computer may comprise, for example, a personal computer, an electronic kiosk system or a cell phone or other handheld device. A kiosk system, as discussed in connection with embodiments of the present invention, refers generally to a publicly accessible device having one or more associated displays for information and services. Playing said notices on a computer may comprise displaying the images, text or video of the notices and/or generating sound corresponding to the audio associated with the notice.

Notices placed on the rich media notice board may include usage metaphors that may allow users to relate to the notices. The user interface to the rich media notice board may employ such usage metaphors to provide an interface that may be used by users who may not read or write with sufficient proficiency to otherwise use computers.

The rich media notice board may interact with one or more social networking sites. Interacting with one or more social networking sites may allow users of the rich media notice board to post notices to or play notices posted by members of the one or more social networking sites.

BRIEF DESCRIPTION OF THE DRAWINGS

Subject matter regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE EXEMPLARY EMBODIMENTS

A rich media notice board may comprise a publicly-accessible repository of notices. Notices to the rich media notice board may comprise text, images, audio and/or video. The rich media notice board may be associated with a community. Such communities may comprise any group of people living in a particular local area such as, for example, a village, a small town, or an urban neighborhood. Communities may also comprise any group of people with common interests and/or common characteristics such as, for example, level of education and/or socioeconomic status. Anyone may post a notice on the rich media notice board, and anyone may access notices posted there.

Figure 1:
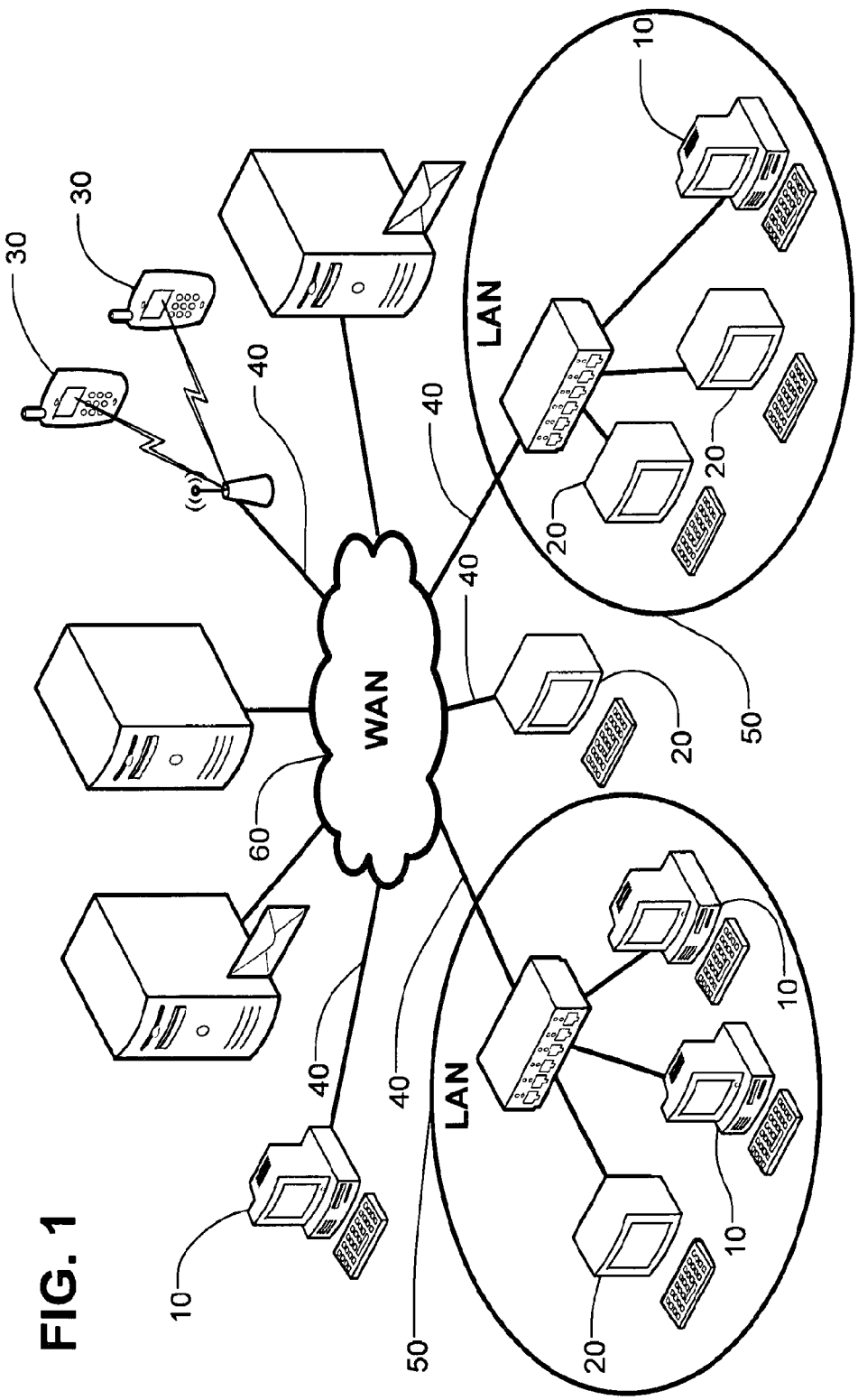
FIG. 1 illustrates infrastructure that may comprise a network containing a rich media notice board and computers operatively connected to the rich media notice board through the network, in an embodiment of an aspect of the present invention.

Referring to FIG. 1, accessing notices on the rich media notice board may comprise playing said notices on a computer. The computer may comprise, for example, a personal computer 10, an electronic kiosk system 20 a cell phone 30, or other mobile device. Playing said notices on a computer may comprise displaying the images, text or video of the notices and/or generating sound corresponding to the audio associated with the notice.

The rich media notice board may be accessed by one or more computers which may be connected to the notice board via one or more network connections 40. A web browser resident on the one or more computers may use, for example, a URL to operatively connect the one or more computers to one or more rich media notice boards that may correspond to one or more communities. Upon the connection of a computer to a rich media notice board, the computer may start playing said notices. The computer may be connected to a loud speaker which may be used to play any audio portion of the notices, which may allow members of the community to passively consume the audio portion of the notices. This passive consumption of the audio portion may, in turn, prompt one or more members of the community to use a computer to observe visual aspects of the notices.

Notices placed on the rich media notice board may include usage metaphors that may allow users to relate to the notices. The user interface to the rich media notice board may employ such usage metaphors to provide an interface that may be used by users who may not read or write with sufficient proficiency to otherwise use computers. In the alternative, the user interface may also comprise conventional interfaces requiring literate users who are reasonably comfortable with computers.

A member of a community may post a notice on a notice board for that community or on the notice board for some other community by, for example, recording an audio clip using a microphone attached to the computer, attaching images captured by a web camera attached to the computer and/or adding text or numbers using a keyboard attached to the computer or a virtual keypad provided by the notice board. In addition, the member of the community posting the notice may tag the notice by choosing one or more icons from a pre-defined set. The icons may correspond to various nouns, such as doctor and vegetable, and various verbs, such as buy and celebrate. The icons may also correspond to usage metaphors. Other examples of icons include, for example, a blackboard corresponding to education, an emblem representing a government (e.g., Ashoka Emblem), a patient corresponding to healthcare, a marriage corresponding to matrimony, money corresponding to a business or buying and selling, a sweeper corresponding to cleanliness, and a tailor corresponding to cottage industries. The icons may also include a picture of the member posting the notice which is particularly useful if more than one member accesses the notice board from the same notice board account or computer. Such icons may serve as subject headers for the notice and may also classify the notice. For example, if a notice comprises a question about a particular plant disease, the member of the community may tag the posting with icons corresponding to plant and health. An automated system may use these tags to, for example, sort, filter and/or route the notices. The automated system may use the tags to route the notices to, for example, experts who may then access and respond to these notices, where the responses may contain answers to any questions posed as part of the original notice. The automated system may not route incorrectly tagged notices to the intended destination, and such notices may not receive responses. Over time, this lack of response may help community members posting notices learn the appropriate way to tag their notices so that the automated system routes the notices in a manner such that the notices may generate an appropriate set of responses.

The rich media notice board may perform automated speech recognition of audio portions of posted notices to extract information regarding the notices that the notice board may not have access to, for example, icons used to tag the notices. The automated speech recognition function may recognize speech in more than one language or dialect used by the community corresponding to the notice board. For example, where the community corresponding to the notice board comprises a rural village, the automated speech recognition function may recognize speech in the one or more official or national languages and/or dialects used in the village, the region and/or the country in which the village is located.

The rich media notice board may store posted notices based on a usage metaphor to which the received notice corresponds. When a notice is received, the rich media notice board may analyze the content of the received notice to associate the content with one or more of an available set of usage metaphors. In this analysis, the rich media notice board may compare the content of the posted notice to an available list of usage metaphors to determine to which, if any, usage metaphors the content relates. This list of usage metaphors can include the icons used to tag notices discussed above. If the content relates to one or more usage metaphors, the posted notice may be associated with that usage metaphor(s). For example, the rich media notice board may recognize speech in an audio posting and analyze this speech to determine that it relates to a health issue. The rich media notice board may then associate the notice to a healthcare usage metaphor. Additionally, a user may select a usage metaphor to associate with a notice when the user is creating the notice.

After a received notice is associated with a usage metaphor, the rich media notice board can search for stored content that relates to the received notice using the usage metaphor. The stored content can be stored on any type of data storage unit or other suitable media that would be recognized by one of ordinary skill in the art. If such content exists in the stored content, the rich media message board can play or display this stored content along with the received notice.

Each notice board may comprise an email address and a list of contacts. Each posting on the notice board may comprise an email message. Each email message posting may attach the text, images, audio and/or video comprising the posting. The notice board interface may comprise an email client. The design of the email client may allow access to people with low levels of literacy. For example, as discussed above, icon tags may serve as message subject fields. The notice boards may be publicly accessible and users of the notice board may or may not have accounts on the notice board with secret passwords. Each user may have an email account and the email account may include a contact list. The contact list may include other users and one or more notice boards. The notice board may filter messages with particular message subjects, which may comprise icon tags. The notice board may also use information extracted from the audio content of posted notices by automated speech recognition to filter messages. The notice board may forward the filtered messages to appropriate experts as a regular email. Such experts may use a traditional email client program to open and view/listen to the message. Such experts may respond by replying, and the reply may include an audio attachment. The reply may then post to the same notice board and may be played by the computer when the notice board is accessed. Message replies may be clustered with the original message into a message thread. Users can open the thread to display the responses to the original message Many email systems such as, for example, Gmail™ allow users to upload pictures of themselves as small image thumbnails. When one user receives a message from another, the sender's image thumbnail is displayed by the email client. Gmail™ also allows a user to select specific images that will override a sender's image thumbnail and display the image selected by the user to correspond to the sender when the user receives an email from the sender. Similarly, the rich media notice board may use images to identify users rather than or in addition to names written in text form. The notice board may also identify users by short audio clips which may comprise the user saying his or her own name. When a message is played on a particular notice board, the audio clip may be played as a part of the message. This may allow the identification of the user corresponding to a posting on the notice board by consumers of the posting who, for example, may not be able to see the screen of the computer, such as when consumers are physically distanced from the notice board or when the posting is played over a loudspeaker. Like email systems such as Gmail™ that allow a user to override a sender's image, the rich media notice board may allow a user to override the images and/or audio clips chosen by senders. This may allow users of the notice board to, for example, specify an image and/or audio clip for a sender where the sender has not specified his or her own image and/or audio clip. The rich media notice board may also use numbers, such as a mobile phone number, to identify the user that posted a message. If the user posts a message to the rich media notice board using a mobile phone, the rich media notice board can automatically add the mobile phone number to the posting.

Figure 2:
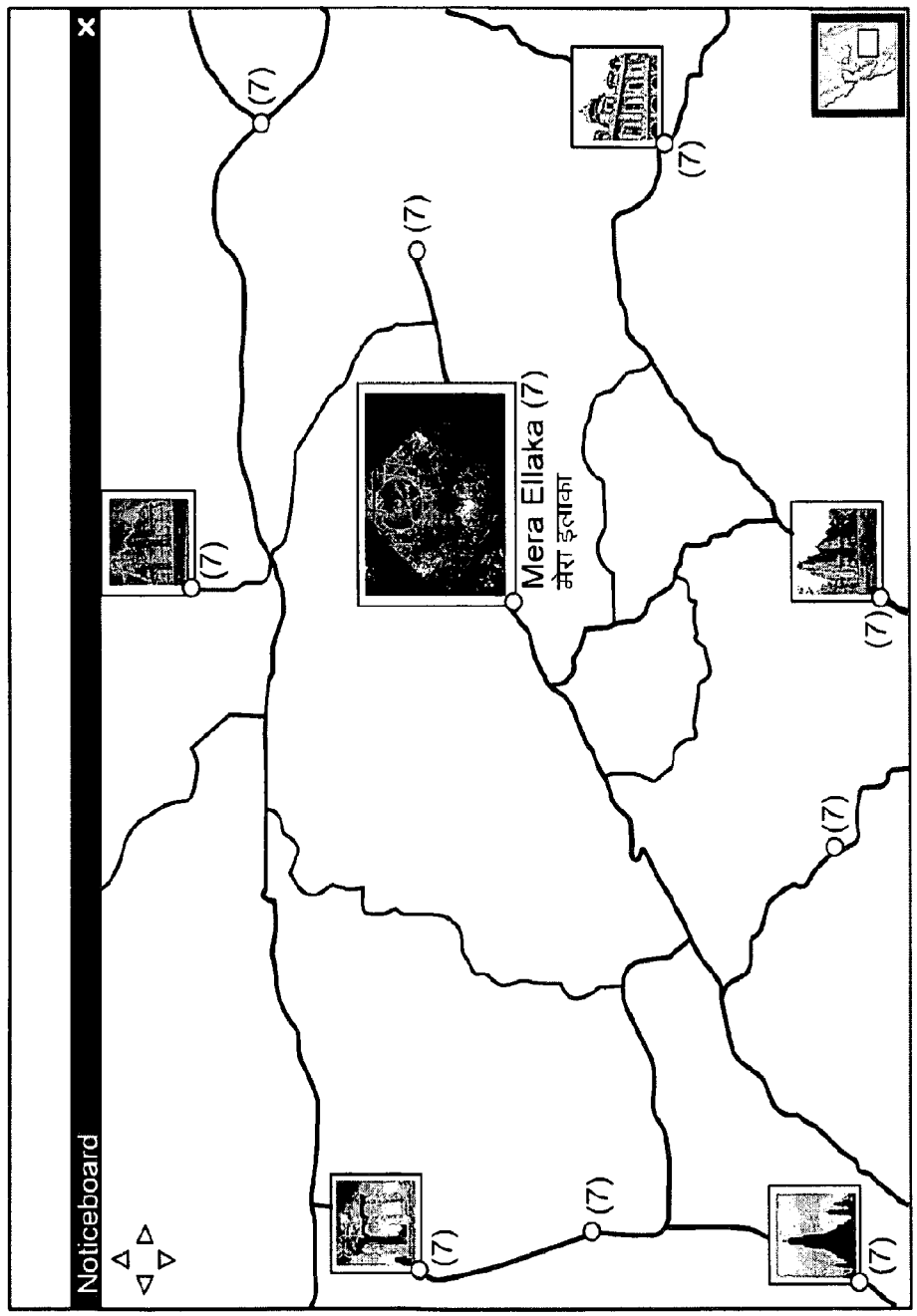
FIG. 2 illustrates, in an embodiment of an aspect of the present invention, a browser window displaying a map view with icons representing rich media notice boards corresponding to different communities.

The computer may represent notice boards that correspond to different communities by, for example, overlaying iconic representations for each community on a map, where each iconic representation may be located on the map at the coordinate location of the community in question. FIG. 2. shows one potential map view with icons representing notice boards corresponding to different communities. The icon for each community may comprise a picture of a landmark familiar to the residents of community and/or nearby, related or similar communities. The icon may also include a descriptive audio clip. This map overlay may allow users to see that notice boards exist for other communities they may be familiar with. The map overlay may also allow users to navigate to notice boards that correspond to other communities using a two-dimensional pan and zoom capability, select an icon that corresponds to a specific community to access the notice board for that community, and play the notices on that notice board.

Figure 3:
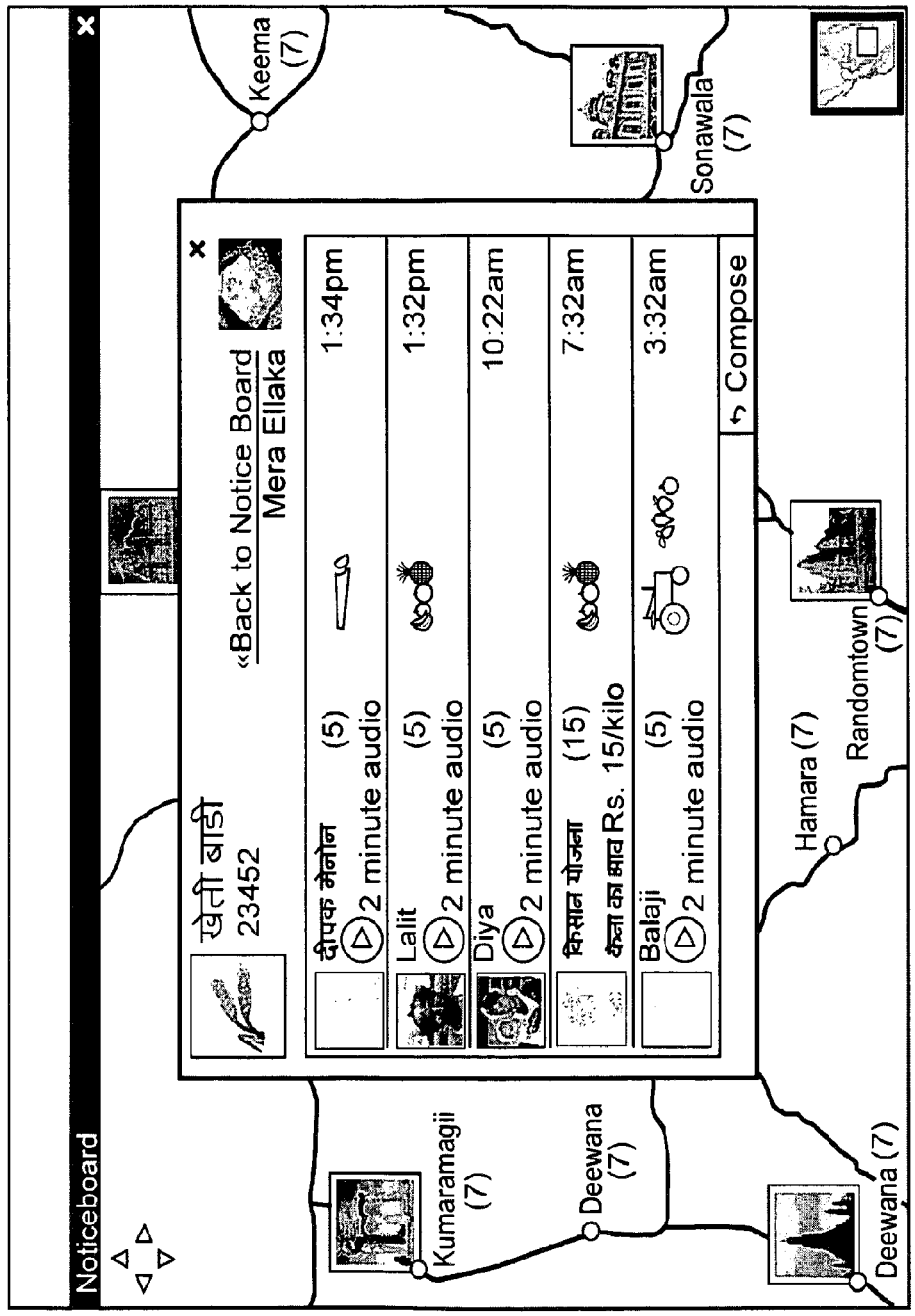
FIG. 3 illustrates, in an embodiment of an aspect of the present invention, a browser window displaying a message list view of messages posted on a rich media notice board.
Figure 4:
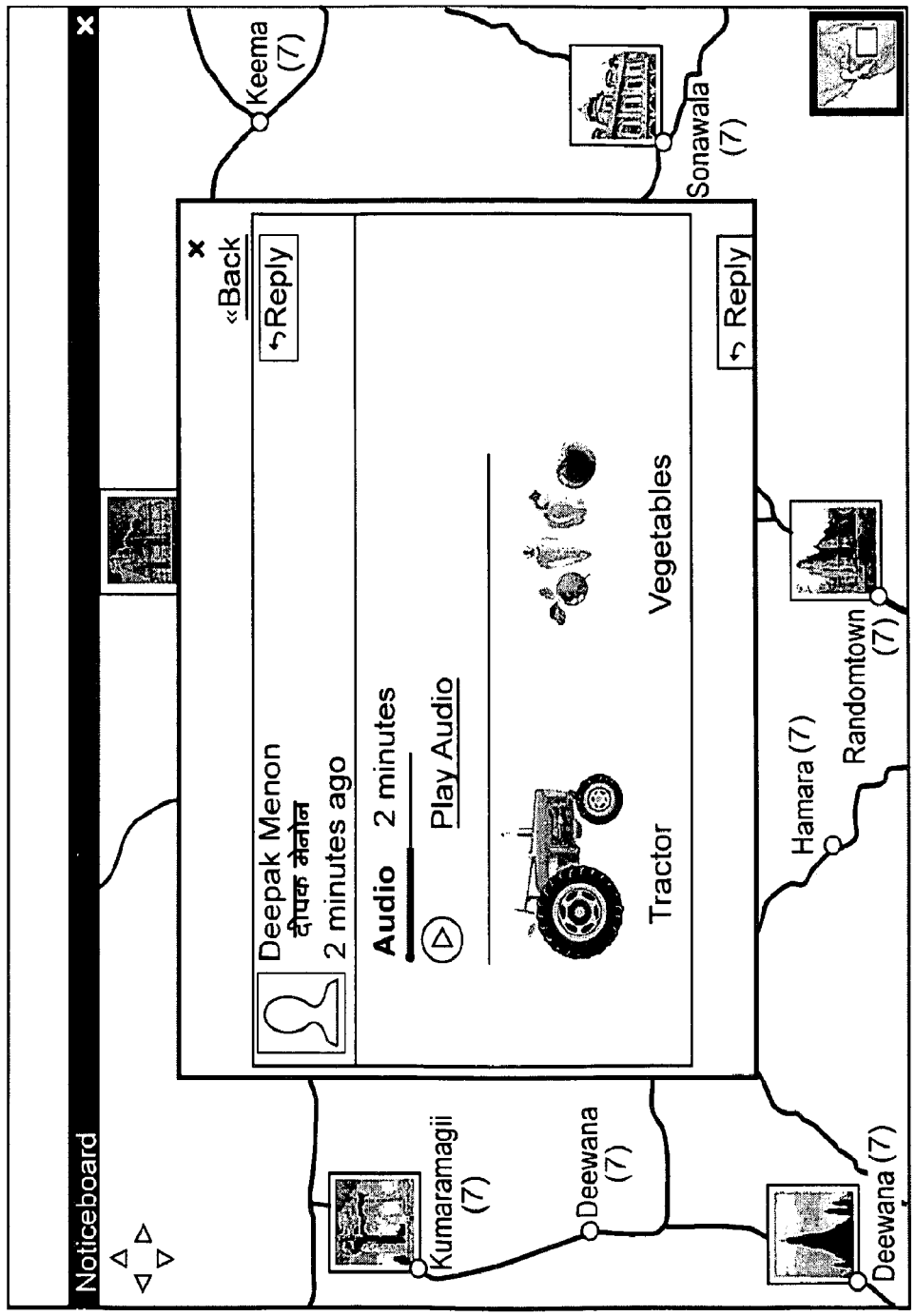
FIG. 4 illustrates a browser window displaying a single message on a rich media notice board, in an embodiment of an aspect of the present invention.

FIG. 3. shows one potential message list view of messages posted on a notice board. The left column shows the pictures of the people who have posted messages on the notice board. In the case of an otherwise anonymous user posting a message from, for example, a community kiosk system, the image corresponding to the community may appear. If the user wishes to identify himself/herself, the user may specify an image captured using web camera associated with, for example, a community kiosk system, which would appear in the message list. The user's name may also appear in the message list. If provided by the user, a subject line may also appear in the message list. If the posting contains text, a snippet of that text may also appear in the message list. Icons used to tag the message may also appear in the message list. If the sender provided an audio clip, a play button may appear in the message list. Although not shown, the message list may include a button that will play all of the messages in the message list. If play all is selected, each message may open up on the screen as shown in FIG. 4 and any associated audio may play. The sender's name may play and/or an audio version of the icons may also play. The audio versions of the icons may comprise, for example, audio representations of the various nouns and verbs that may correspond to the icons. These audio representations may reflect one or more languages that the community may understand. For example, community kiosk system in a rural village may play audio representations of one or more official or national languages of the country in which the village is located as well as any dialects corresponding to the region in which the village is located. When played, the audio recordings may cause an audio dissemination system to generate an audible signal that one or more members of the community may perceive, for example, by playing the recording over a loudspeaker or public address system, or to generate signal that may be translated into an audible signal, for example, a community radio broadcast that may be received by a standard AM or FM radio. A kiosk system may play one or more audio representations of the icons corresponding to one or more official or national languages and/or dialects based on, for example, the geographic location of the village, the user posting the notice to the notice board, and/or any information available regarding any members of the community who may perceive the audible signal. If there is no audio component, an indicator that the message does not include audio may play. The message may stay on the screen for a predetermined amount of time before advancing to the next message.

FIG. 4. shows a single particular message as it may appear when played. The icon labels may appear on the screen along with the sender's picture. A play button may also accompany the message that, when activated, may play the message, any video contained in the message, any audio versions of the icon labels, any audio clip(s) that may identify the user who posted the message and/or any combination thereof.

The computer may include a removable, bootable media, for example, a bootable CD or bootable flash key, which may reduce the complexity of using the computer, starting a web browser and connecting to a notice board for a community that may correspond to the computer. In this scenario, the bootable media may operatively connect to the computer before the computer is powered on, for example, the CD may be inserted into the CD tray or the flash key may be plugged in prior to powering on the computer. When powered on, the computer boots from the bootable media. The bootable media may contain an operating system kernel, such as a Linux® kernel, along with a set of device drivers for common hardware. The bootable media may also contain code that probes the hardware to identify the devices operatively connected to the computer and load the corresponding drivers. Code on the bootable media may configure the network and bring the machine up to a stage where the computer has access to the network and the ability to display a browser. The code may also look up some unique hardware identifier on the PC (such as a machine serial number or a network MAC address) and send this information to a network service which may identify the computer and provide the computer with the identity of the village notice board that it needs to connect to. The code on the media may also start a web browser and connect it to the identified notice board.

Note that the computer would generally not use software installed on its fixed media when operating in this mode. Computers having one operating system, for example Microsoft Windows®, installed on fixed media may boot a different operating system, for example, Linux® from removable, bootable media, and the computer may run the operating system on the removable media without using or in any way affecting the operating system installed on its fixed media. The operating system running from the removable media may use free space on the computer's fixed media for storing swap state. Operating in this mode may increase the computer's resistance to malicious software. For example, if any malicious software were to infiltrate the computer while it is running from a CD, the malicious software would have no way to make any persistent change to the CD and would only exist in DRAM. In this example, shutting down or restarting the machine would eliminate such malicious software.

Referring again to FIG. 1, kiosk systems 20 may comprise one or more computers which may connect to a local area network (LAN) 50 which may in turn connect via a broadband router to a wide area network (WAN) 60. Kiosk systems 20 may also comprise one or more computers connected directly to a WAN via a broadband connection. If connected to a router, the router may include a DHCP server that may provide network configuration parameters to the one or more computers at the kiosk. If the kiosk system is connected to a DHCP-capable router and the computer is booting from removable, bootable media, the code on the bootable media may initially configure the computer to access the network by causing it to configure the hardware, including the network hardware, such that it may send a DHCP request to the router, and then sending such a DHCP request to the router.

If a kiosk system computer does not have access to a DHCP-capable router the computer may require some networking parameters to connect to the network. The removable, bootable media may contain code instructing the computer to look for a special file containing networking parameters after boot if a DHCP request is unsuccessful. If the computer finds such a file, the computer may read network parameters from this file to configure the computer to access the network. If such a file is not found, the computer may prompt a user to provide networking parameters and the computer may use these parameters to access the network. The computer may also store such networking parameters provided by a user in a special file on the hard drive. This may allow the re-use of networking parameters provided by a user for each boot operation of the computer.

Kiosk systems 20 may include the ability to download and locally cache notice board messages. These kiosks may play such cached messages from cache memory when, for example, the network becomes unreliable or unavailable. Kiosk systems 20 may use a browser extension, for example Google™ Gears, to store messages in a local cache for access when the computer is offline and/or the network is unreliable or unavailable. If the computer boots from removable, bootable media, the local cache may reside in DRAM, which is not persistent across reboots. In this scenario, the computer may contain a second fixed-media special file to serve as a backing store for the cache.

Kiosk systems 20 may include a web camera to allow members to take pictures for themselves and include the pictures with notice board messages. The kiosk systems 20 may also include a microphone for recording audio snippets to include in notice board messages.

Figure 5:
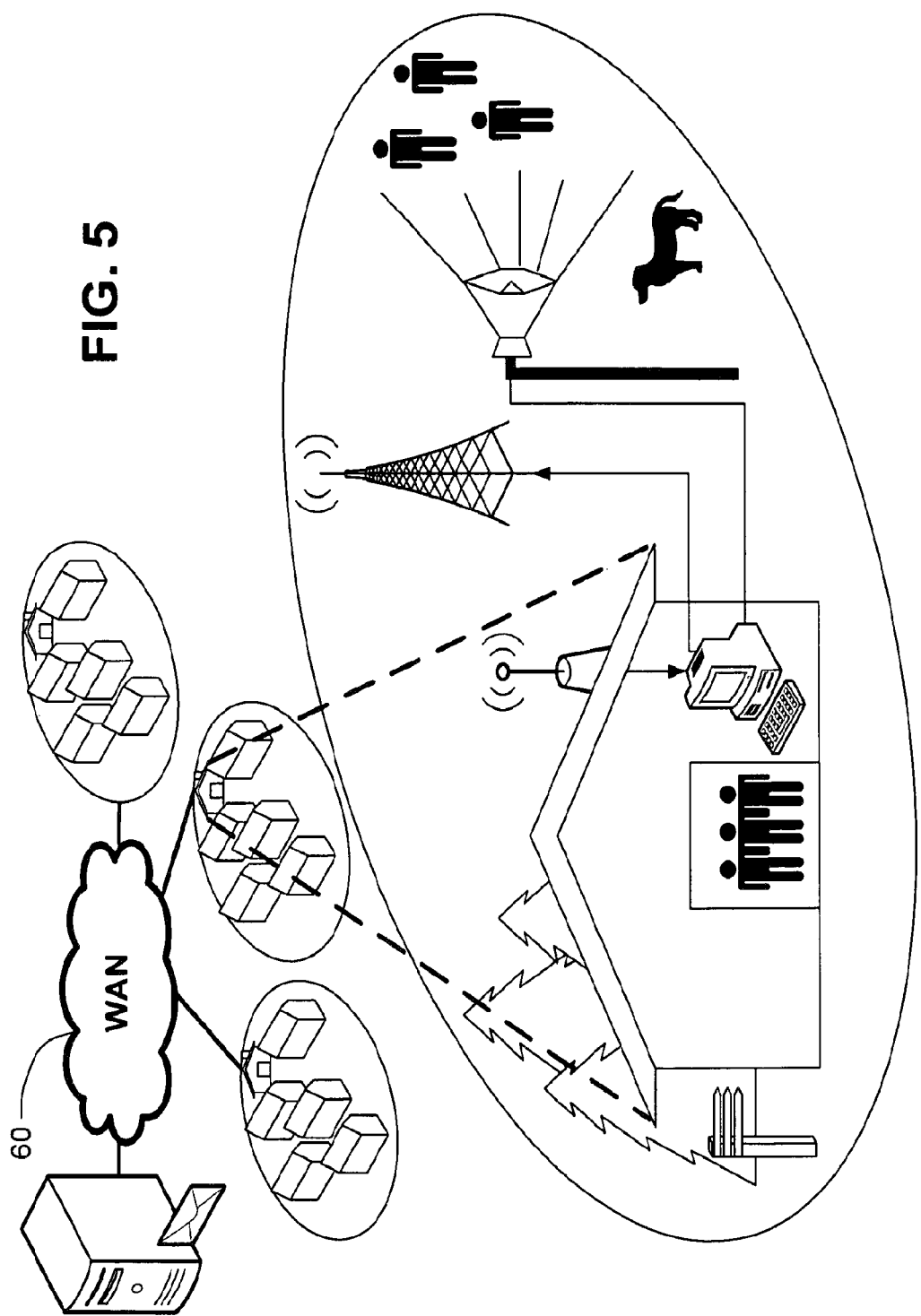
FIG. 5 illustrates an embodiment of a rich media notice board kiosk system serving a geographic community in accordance with an embodiment of the invention, which may also communicate content arranged for and distributed to the community, the kiosk system transmitting audible content among the communicated content to members of the community via one or more audio dissemination systems.

FIG. 5 illustrates an embodiment of the rich media notice board in which a community that the notice board corresponds to comprises a geographic location. The broadband connection through which the computer connects to the notice board may comprise a cellular network. The computer may further connect to an audio dissemination device that may communicate notices to one or more members of the community. The audio dissemination device may comprise, for example, a loudspeaker, a public address system and/or a community radio transmitter.

The rich media notice board may also provide advertisements to users of the notice board. The notice board may use available information to target advertisements to the users of the notice board. Available information may include, for example, information regarding the geographic location of the notice board, the community associated with the notice board and/or the geographic location of the notice board, the time of day, the season of the year, the user of the notice board to whom the advertisement will be delivered as well as the content of the notices. The notice board may analyze the information contained in the notices to target advertisements to the users of the notice board. This analysis may include analysis of usage metaphors, for example the icon tags corresponding to specific notices, to identify advertisements to play to the users of the notice board. This analysis may also include analysis of speech recognized through automated speech recognition. The notice board may compare the analyzed information to a list of advertising topics, and determine which advertisements to play based on the results of such a comparison. The advertisements may comprise text, images, audio and/or video. The advertisements may also comprise usage metaphors, including, for example, icons from the same predetermined set used to tag notices posted to the notice board.

The notice board may include an ad consumer interface. Advertisers who may wish to advertise on the notice board may provide the content for the advertisement via the ad consumer interface. The ad consumer interface may allow the ad consumer to specify text, images, audio and/or video that may comprise the content of the ad. The ad consumer interface may also allow the ad consumer to associate usage metaphors with the ad, including, for example, icons from the same predetermined set used to tag notices posted to the notice board. The notice board may analyze this content to associate the content with one or more advertising topics for comparison with notices posted to the notice board.

The ad consumer interface may also collect information that may be used to bill for the ad. The ad consumer interface may also provide information regarding the performance of the ad such as, for example, what ads have been shown, how often they have been shown, the number of times they have been selected, who has selected those ads, how often display of the ad has led to consummation of a transaction. The ad consumer interface may also provide information regarding the number of people responding to an ad, for example, the number of people who redeemed a coupon or called a number corresponding to the ad.

The rich media notice board may interact with one or more social networking sites. Interacting with one or more social networking sites may allow users of the rich media notice board to leverage social networks, for example those created by sites such as Orkut™, and post notices to or play notices posted by members of the one or more social networking sites without having an account on the social network. Users of the notice board may interact with users of the social networking sites through one or more accounts that the notice board may have on the social networking sites. Notice board accounts on social networking sites may correspond to the community, groups of members of the community and/or individual members of the community corresponding to the notice board. Members of the one or more social networking sites may interact with the community, groups or individual members of the community corresponding to the notice board through the one or more accounts that the notice board may have on the one or more social networking sites. Users of the notice board may access experts, for example in the fields of agriculture, medicine and finance, who are members of the social network through the notice board, which will access the social networks using the one or more accounts associated with the notice board. This may allow users of the notice board to leverage the benefits of a complex social networking platform with minimal computer knowledge.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
using one or more computers to send and receive messages in an electronic message board over a network, said messages comprising user content and an icon selection received from at least one user, wherein the user content comprises non-textual and textual content, wherein the non-textual content comprises audio content;
recognizing speech in the received audio content;
comparing content of the recognized speech to a predetermined set of usage metaphors, each of the set of usage metaphors associated with an icon, to identify a first usage metaphor corresponding to the recognized speech;
storing, in a non-transitory data storage associated with the electronic message board based on the comparing, the received user content and an association between the received user content and the first usage metaphor and a first icon corresponding to the icon selection, wherein other content received from other users is stored in the data storage and associated with other metaphors that are different than the first usage metaphor;
searching, after the associating, for stored content related to the first usage metaphor;
identifying, based on the searching, at least one result associated with the first usage metaphor, each result comprising a respective audio element and a respective icon stored for the respective audio element; and
display on a user interface associated with the electronic message board, for each result of the at least one result, a representation of the result including the respective icon of the result, and a corresponding control for activating the respective audio element of the result.

2. The method of claim 1, further comprising:
playing a sequence of messages associated with the first usage metaphor, wherein at least one of the sequence of messages comprises an advertisement chosen based on one of a geographic region.

3. The method of claim 1, further comprising:
playing a sequence of messages associated with the first usage metaphor, wherein the messages are addressed to a predetermined target community.

4. The method of claim 3, wherein the target community comprises a predetermined geographic region.

5. The method of claim 3, wherein the target community corresponds to a village or an urban area.

6. The method of claim 3, further comprising the steps of:
displaying, on a display device, a map;
displaying, on the display device, one or more markers indicating a location of one or more communities;
receiving an indication that an activated marker of the one or more markers was activated; and
accessing messages addressed to the community corresponding with the activated marker.

7. The method of claim 6, further comprising the step of classifying the messages using one or more labels that correspond to the user content.

8. The method of claim 7, wherein each label comprises one of a descriptive pictorial icon and a descriptive audio clip.

9. The method of claim 7, wherein the step of classifying the messages further comprising the steps of:
performing automated speech recognition on an audio portion of the message; and
using results of the automated speech recognition to identify classifications for the message.

10. The method of claim 1, further comprising:
providing access to an audio dissemination device;
playing a sequence of messages through the audio dissemination device, wherein access to the audio dissemination device is provided at a public location.

11. The method of claim 1, the method further comprising:
capturing a photo in connection with receiving the user content; and
storing the received user content together with an association between the received user content and the photo; and
displaying a representation of the user content together with the photo.

12. The method of claim 1, further comprising:
receiving an indication that a stored audio element of an identified result was activated via the control corresponding to the identified result; and
play the stored audio element in response to receiving the indication.

13. A computer program product comprising:
a non-transitory computer-readable medium having computer-readable program code embodied therein for displaying content in an electronic message board, the non-transitory computer-readable medium comprising:
computer-readable program code for receiving user content into the electronic message board from a physically available system, the user content comprising at least one audio element;
computer-readable program code for recognizing speech in the at least one audio element of the content received from the physically available system;
computer-readable program code for comparing content of recognized speech to a predetermined set of usage metaphors, each of the set of usage metaphors associated with at least one of a plurality of predetermined icons, to identify a first usage metaphor corresponding to the recognized speech;

computer-readable program code for storing, based on the comparing, the received user content and an association between the received user content and the first usage metaphor and a first icon of the plurality of predetermined icons, wherein other content received from other users is stored and associated with other metaphors that are different than the first usage metaphor;

computer-readable program code for identifying, based on the first usage metaphor, stored content related to the received user content, the stored content comprising one or more stored audio elements and a stored icon for each of the one or more stored audio elements; and computer-readable program code for displaying, on a user interface associated with the electronic message board, a representation of the stored content and a respective control for activating each stored audio element of the stored content.

14. The computer program product of claim 13, wherein the received user content further comprises one of text, video information, and usage metaphors.

15. The computer program product of claim 13 wherein the plurality of predetermined icons comprise icons corresponding to concepts, the non-transitory computer-readable medium further comprising:

computer readable program code for receiving a selected icon of the plurality of predetermined icons for the received user content, wherein the computer-readable program code for storing comprises computer-readable code for storing an association between the received user content and the selected icon.

16. The computer program product of claim 13, wherein the computer-readable program code for displaying stored content comprises computer-readable program code for displaying screen-displayable stored content on a display device in communication with a computer.

17. The computer program product of claim 13, wherein the computer-readable program code for displaying stored content comprises computer-readable program code for transmitting at least one audio element to an audio dissemination system.

18. The computer program product of claim 13, wherein the content is specific to a predetermined community.

19. The computer program product of claim 13, wherein the non-transitory computer-readable medium further comprises:

computer-readable program code for capturing a photo in connection with receiving the user content; and computer-readable program code for storing the received user content together with an association between the received user content and the photo; and computer-readable program code for displaying a representation of the user content together with the photo.

20. The computer program product of claim 13, wherein the non-transitory computer-readable medium further comprises:

computer-readable program code for playing a respective stored audio element of the one or more stored audio elements in response to receiving an indication that the respective stored audio element was activated via a corresponding control.

21. A kiosk system, comprising:
a display device;
a non-transitory data storage unit storing data associated with an electronic message board; and
a computer in communication with the display device and the data storage unit, the computer being configured to:
receive, for the electronic message board, user content comprising at least one audio element recorded by at least one user and an icon selection;
recognize speech in the at least one audio element;
identify a first usage metaphor in a plurality of predetermined metaphors based on the recognized speech of the at least one audio element, the first usage metaphor being associated with at least one icon associated with the icon selection;
store, in the data storage unit, the received user content together with an association between the received user content and the first usage metaphor and the at least one icon, wherein other content received from other users is stored in the data storage unit and associated with other predetermined metaphors that are different than the first usage metaphor;
search, based on the first usage metaphor, for additional message content associated with the first usage metaphor and provided by one or more other users to the electronic message board;
receive, based on the search, at least one result, each result for a respective audio element and a respective icon stored in association with the respective audio element; and
display, on the display device for each result of the at least one result, a representation of the result including the respective icon of the result, and a corresponding control for activating the respective audio element of the result.

22. The kiosk system according to claim 21, wherein the computer is associated with a target geographic community, and wherein the user content is associated with the target geographic community.

23. The kiosk system according to claim 22, wherein the at least one audio element, when stored, is designated for distribution to other predetermined individuals in the target geographic community.

24. The kiosk system according to claim 22, wherein the computer is in communication with an audio dissemination system and activation of the stored audio element initiates distribution of the at least one audio element via the audio dissemination system to other individuals in the target geographic community.

25. The kiosk system according to claim 22, wherein the computer is further configured to:
display on the display device a map comprising a plurality of markers, each marker indicating a location of one or more predetermined geographic communities including the target geographic community.

26. The kiosk system according to claim 25, wherein each marker of the plurality of markers operates as a control to activate content directed at a respective one of the one or more predetermined geographic communities.

27. The kiosk system according to claim 25, wherein each marker comprises a non-textual element particular to that marker's corresponding geographic community.

28. The kiosk system according to claim 25, wherein each of the predetermined geographic communities corresponds to a village or an urban neighborhood.

29. The kiosk system according to claim 21, wherein the at least one audio element comprises a file containing an audio clip.

30. The kiosk system according to claim 21, further comprising a cache in communication with the computer for download and local storage of received content to draw upon for display in an event that communication between the computer to a source of the received user content is interrupted.

31. The kiosk system of claim 21, further comprising:
a camera,
wherein the computer is further configured to:
capture, using the camera, a photo in connection with receiving the user content; and
store the received user content together with an association between the received user content and the photo; and
display a representation of the user content together with the photo.

32. The kiosk system of claim 21, wherein the computer is further configured to:
receive an indication that a stored audio element associated with a received result was activated via the control corresponding to the received result; and
play the stored audio element in response to receiving the indication.

* * * * *